United States Patent [19]

Hunt et al.

[11] Patent Number: 5,192,574
[45] Date of Patent: Mar. 9, 1993

[54] CORN RINGS AND METHOD OF MANUFACTURE

[75] Inventors: Dewey R. Hunt; Veldon M. Hix, both of Idaho Falls, Id.; Miles J. Willard, 229 N. Lloyd Cir., Idaho Falls, Id. 83402; Kyle E. Dayley, Rigby, Id.

[73] Assignee: Miles J. Willard, Idaho Falls, Id.

[21] Appl. No.: 806,627

[22] Filed: Dec. 13, 1991

Related U.S. Application Data

[60] Division of Ser. No. 743,078, Aug. 9, 1991, Pat. No. 5,100,686, which is a continuation of Ser. No. 424,061, Oct. 19, 1989, abandoned.

[51] Int. Cl.⁵ .............................. A23L 1/10
[52] U.S. Cl. ...................... 426/549; 426/439; 426/518; 426/808
[58] Field of Search ............... 426/439, 549, 518, 808

[56] References Cited

U.S. PATENT DOCUMENTS

| | | | |
|---|---|---|---|
| 1,566,705 | 12/1925 | Tanzi . | |
| 1,946,238 | 2/1934 | Ronzoni | 107/14 |
| 2,431,074 | 11/1947 | Palmer | 107/54 |
| 2,584,893 | 2/1952 | Lloyd et al. | 99/93 |
| 2,621,615 | 12/1952 | Lombardi | 107/54 |
| 2,905,559 | 11/1958 | Anderson et al. | 99/80 |
| 3,020,162 | 1/1962 | Cunningham et al. | 99/80 |
| 3,046,139 | 7/1962 | Gould et al. | 99/93 |
| 3,083,103 | 3/1963 | Anderson et al. | 426/549 |
| 3,212,904 | 2/1963 | Gould et al. | 99/93 |
| 3,278,311 | 10/1966 | Brown et al. | 99/80 |
| 4,126,706 | 11/1978 | Hilton | 426/808 |
| 4,221,340 | 9/1980 | dos Santos | 426/518 |
| 4,288,463 | 9/1981 | Groff et al. | 426/500 |
| 4,329,371 | 5/1982 | Hart | 426/518 |
| 4,411,927 | 10/1983 | Bermudez et al. | 426/518 |
| 4,463,022 | 7/1984 | Sterner et al. | 426/518 |
| 4,504,511 | 3/1985 | Binley | 426/565 |
| 4,513,018 | 4/1985 | Rubis | 426/622 |
| 4,803,091 | 2/1989 | Molter et al. | 426/549 |
| 4,876,101 | 10/1989 | Willard | 426/549 |

Primary Examiner—Jeanette Hunter
Assistant Examiner—Mary S. Mims
Attorney, Agent, or Firm—Hopkins, French, Crockett, Springer & Hoopes

[57] ABSTRACT

A process for producing expanded corn snack products. The products are preferably made in a fluted ring shape, and have an expanded, airy texture. The process for producing the products includes successive cutting steps wherein the corn is comminuted to a relatively narrow particle size distribution with most of the corn retained on a #40 or #60 mesh screen. The corn is comminuted by impelling whole cooked corn kernels against a blade and through a screen having a ratio of open area: screen material of from about 1:1 to about 3:1.

17 Claims, 2 Drawing Sheets

CORN RINGS AND METHOD OF MANUFACTURE

CROSS REFERENCE TO RELATED APPLICATIONS

This is a division of application Ser. No. 07/743,078 filed on Aug. 9, 1991, now U.S. Pat. No. 5,100,686, which is a continuation of application Ser. No. 07/424,061 filed on Oct. 19, 1989 and now abandoned.

BACKGROUND OF THE INVENTION

Snack foods have traditionally been manufactured from raw materials having a base either of potatoes (fresh, sliced or dehydrated) or corn. Corn snacks are either sheeted or extruded into a flat planar configuration (tortilla chips) or into various shapes depending upon extruder die design. Corn is typically prepared for inclusion in snack foods by either preparing a limed masa for a traditional Mexican flavor, or by simply cooking the corn without lime to avoid the Mexican flavor.

The most common method of preparing corn masa is to grind the cooked corn kernels in a stone grinder. Such stone grinds consist of a pair of cylindrical stones having radially fluted faces, with one stone stationary and the other rotating. Cooked corn is fed through an opening in the center of the stationary stone by an auger, and is ground as it is forced radially outwardly along the radial flute. Manufacturers of corn masa have recognized for many years that the production of acceptable masa is an art, not a science. Typically, an operator of a stone grinder having many years experience simply "feels" the ground corn exiting the stone grinder to determine whether or not it is acceptable. No empirical tests are used in the industry to determine whether or not an acceptable grind is occurring. Rather, if the ground corn exiting the stone grinders is too coarse to the feel, the operator simply reduces the gap between the stones; conversely, if the corn exiting the grinders is too fine, the operator increases the gap between the stones.

While the art of stone grinding corn is quite subjective the results of a ground corn being too coarse or too finely ground can be dramatic. Fried snack foods made from coarsely ground corn have a grainy, sandy texture, and because of the coarse grinding, the snacks are crumbly and do not hold together well. Snacks made from corn too finely ground form a very dense, hard product which is unpleasantly brittle. Therefore, the correct grind on the corn masa is critical to manufacturing a consistent corn snack having acceptable organoleptic properties.

The grinding action of stone grinders tends to produce a relatively high proportion of "fines" in the ground corn. As used herein, the word "fines" means corn particles capable of passing through a U.S. #80 mesh screen (having an aperture diameter of 0.177 mm). As noted above, fines tend to produce a hard, dense, brittle product. In U.S. Pat. No. 4,803,091, issued Feb. 7, 1989, a process is disclosed for the manufacture of fried corn snacks wherein limed corn is produced by a combination of stone grinding followed by grating/cutting in a cutting mill, such as an Urschel Comitrol mill. The ground corn is incorporated into a dough, which is extruded in a spiral ribbon, subsequently cut into individual pieces and fried.

Manufacturers of fried masa-based corn snacks generally rely upon the natural expansion of the masa to effect the final product characteristics. However, because stone grinding produces a variable level of fines, expansion of corn snacks is often greater or less than optimal, resulting in a product having unpredictable organoleptic properties, such as taste, texture, grittiness or hardness. Consumers have come to accept these attributes as representative of fried masa-based corn snacks.

Therefore, it is an object of the present invention to produce a masa-based fried corn snack having an expanded, less dense texture resulting from the inclusion of fewer fines in the dough. Additionally, ingredients added to the dough to induce additional expansion of the dough during frying are contemplated. Finally, it is an object of the present invention to provide a process whereby corn masa having a reasonably consistent particle size distribution can be produced, so that products having known attributes can be designed.

SUMMARY OF THE INVENTION

In its broadest aspects, the present invention comprises a fried corn-based snack food product having a texture substantially more expanded than those previously manufactured from corn masa. The expanded texture of the inventive products results from a novel masa preparation technique, as well as the addition of expansion-inducing constituents to the masa dough.

In a preferred embodiment of the invention, cooked corn is not ground by a stone grinder. Rather, the cooked corn of the present invention is subjected to successive cutting steps wherein the corn is cut to a preferred particle size distribution. In the preferred embodiment, the corn is cut by impelling the corn against a blade and then through a screen sized to produce the desired particle size distribution. Preferably, the once-comminuted corn is comminuted a second time by a similar process having either the same or smaller openings in the screen against which the corn is impelled. Preferably, from about 30% to about 50% of the corn comminuted a second time passes through a U.S. #40 mesh screen (having an aperture diameter of 0.42 mm), and less than about 30% passes through a U.S. #80 mesh screen.

In a second embodiment of the present invention, an expansion-inducing starch or starch-containing ingredient is added to the corn masa to produce a dough which, when extruded and fried, exhibits substantially greater expansion in the fried product than would have been the case without the starch ingredient having been added. For example, commonly assigned U.S. Pat. No. 4,623,548, discloses a process for increasing the expansion of cereal-based extruded snacks by adding (1) a high water-absorbing component (HIWAC) comprising one or more pregelatinized cereal starches or flours comprising from about 3% to about 40% by weight, of the total dry solids; and (2) a starch component comprising one or more ungelatinized starches comprising from about 10% to about 45% by weight, of the total dry solids. The HIWAC has a substantially greater ability to hold water throughout frying, until the gelatinization temperature of the residual raw starch contained in the dough is reached. This retains the water in the dough piece long enough to hydrate the residual raw starch in the dough to cause the starch to gelatinize and form an expanded, fried snack structure.

The preferred shape of the product of this invention is a fluted ring. The dough is extruded through a conventional extrusion apparatus in the shape of a ring having a smooth inner surface and an undulating, or fluted, outer surface. The size of the screen in the cutting mill through which the corn is directed must be sufficiently small to insure that particles exiting the cutting mill are smaller than the minimum dimension in the fluted die through which the dough is to be extruded. Applicant has found that the preferred dimensions of the fluted die are a minimum opening (between the center die post and the trough of the flutes) of about 0.85 mm, while the maximum diameter (between the center die post and the top, or radially outermost portion of the flute) of about 2.00 mm.

The process of the present invention utilizes a mixture of yellow dent and white dent corn cooked with lime in the conventional manner. The corn raw ingredients of this process are conventional in all respects. Extrusion is preferably through a conventional batch piston extruder, such as those manufactured by Heat and Control, Inc., or a continuous extruder such as the Model 750 manufactured by Marlin Research Corp.

DETAILED DESCRIPTION OF THE INVENTION

Figure 1:
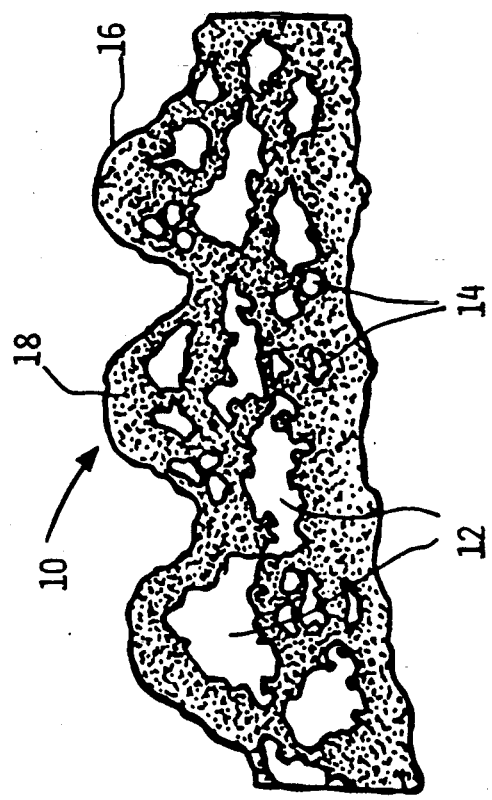
FIG. 1 is a graphic illustration of an expanded product made according to the process of the present invention.

In a preferred embodiment of the invention, the snack food product is a corn ring having dimensions of about 12 mm in length, 20 mm in width and about 2.35 mm in thickness. The inner surface of the ring is smooth, while the outer surface is provided with an undulating, or fluted, topography. The product after frying resembles other fried corn snacks currently on the market, such as Fritos, or Spirals. The product may be seasoned with salt or other seasonings, such as nacho or barbecue.

The products of this invention are produced by conventionally cooking whole corn kernels, comminuting the corn in successive cutting steps, forming an extruding the corn dough, and frying individual corn pieces. The process of the present invention is inventive in three respects: (a) the novel cutting procedure to produce a particle size distribution resulting in fried snacks having optimal organoleptic properties, (b) the addition of expansion-inducing ingredients to the corn dough, and (c) the use of a novel die shape to produce the fried products of this invention.

In each of the examples set forth below, 40 pounds of a mixture of 75% yellow dent and 25% white dent corn was added to 64 pounds of cold water containing 364 gm lime (or, 2% lime added based upon the weight of the corn). The mixture was cooked in a jacketed steam kettle and the temperature increased to boiling with occasional stirring. After simmering 25 minutes with constant stirring, the contents were added to 64 pounds of fresh water at 80° F., reducing the temperature to about 145° F. The cooked corn was soaked in water for about 16 hours, after which time the temperature had decreased to about 100° F. The liquid was drained and the corn kernels were rinsed in cold water to remove hulls and slime. After draining for about 5 minutes, the corn was further processed as set forth below.

The process of the present invention contemplates cutting the cooked corn kernels, but not grinding the kernels as is conventionally practiced with a stone grinder. A number of different rotary cutting techniques can be used for cutting the corn in the process of the present invention, such as the Fitzmill manufactured by the Fitzpatrick Company, Applicants have found that cutting the cooked corn with a Urschel Comitrol mill provides exemplary results. Applicants have found that it is possible to design a particle size distribution in a batch of ground corn depending upon the particular cutting head chosen for the Comitrol mill. The cutting heads are provided in various configurations depending upon the relative ratio of the open area in the screen through which the cut corn is discharged. The screen material may be provided in various widths comprising from 33% of the total area of the screen (or, stated differently, a 2:1 ratio of screen material:open area) to about 80% open area (or a 1:4 ratio of screen material:open area). It is to be understood that, as used herein, the term "screen" or "screen material" is actually the cutting head of a Comitrol mill. Product is introduced into the radially innermost portion of the cutting head and impellers sweep the corn kernels against cutting blades and the "screen material", thereby reducing the corn kernels in size until they are small enough to pass through the open area in the cutting head or screen material.

The process of the present invention may be more easily understood with reference to the following examples:

EXAMPLE 1

Corn was cooked as set forth above. After draining, the corn was fed into an Urschel Comitrol mill fitted with a 2B 030030 head, the comminuted corn was collected and refed to the same Comitrol mill refitted with a 2B 010030 head. The 2B 030030 head (hereinafter "the 30/30 head") identifies an Urschel cutting head wherein the "2B" identifies the size and style of head, the initial three digits (030) identify the thickness of the bar separating adjacent open spaces and the final three digits (030) identify the width of the opening between adjacent bars. The bars and openings constitute what is defined herein as the "screen", and the bars correspond to the "screen material".

After being twice cut through the Comitrol mill, 3,400 gm of the cut corn at about 48% moisture was mixed in a Hobart planetary mixer with a mixture of dry ingredients constituting 5% of the total solids on a moisture-free basis. The dry ingredients comprised 400 gm of a pregelatinized lightly modified waxy maize starch manufactured by National Starch Co., 60 gm of salt and 25 gm of a mono- and diglyceride emulsifier manufactured by Durkee Industrial Foods. The corn and dry ingredients were mixed on a medium speed for approximately 40 seconds, after which 90 gm of water was added over a period of 10 seconds, with mixing continuing for 40 seconds. After standing for approximately 15 minutes, 650 gm of the dough was compressed to remove entrained air and placed in a piston extruder having dimensions of 2 inches (diameter) by 11.5 inches (length). The dough was extruded by a hydraulic piston at approximately 240 psi (dough pressure) through an annular fluted die. The die post had a smooth exterior surface, producing a smooth interior on the extruded dough. The fluted extrudate had a minimum thickness of about 0.87 mm and a maximum thickness of about 2.02 mm. The extruded dough tube was cut to appropriate lengths (about 12 mm) with a reciprocating wire, with individual dough pieces dropping directly into a fryer, where they were fried for approximately 105 seconds at 390° F. to a moisture content of less than 2%.

EXAMPLE 2

A corn dough was prepared as in Example 1, with the exception that no dry ingredients or emulsifier were added to the dough. One hundred percent corn dough was extruded and fried as set forth in Example 1.

EXAMPLE 3

Products were produced with a 95% corn dough and a 100% corn dough as set forth in Examples 1 and 2 in the shape of a ring having a smooth, non-fluted exterior and a relatively flat rectangular chip. The smooth ring was extruded with an 18.1 mm outside diameter and an inner diameter of 1.2 mm. The rectangular chip was extruded as a ribbon, or strip 18.1 mm wide and 1.3 mm thick.

EXAMPLE 4

Products were produced to determine the correct level of the expansion-inducing ingredient.

A. The level of the pregelatinized starch from Example 1 was increased to 8% resulting in an expansion of 1.70. This product was determined by a taste panel to be too soft in texture.

B. The smooth ring die of Example 3 was used to compare the starch ingredient of Example 1 to a pregelatinized amioca starch made by American Maize Company each added to separate batches at a rate of 5% of total solids. Expansions of 1.53 and 1.62 respectively were obtained, as compared to 1.29 for a control sample of this corn at 100% corn.

C. A double-fluted die (undulations on both the inner and outer surfaces) was used to extrude a mixture of amioca starch and pregelatinized corn flour (Illinois Cereal Mill No. 965) at 5% each of total dry solids. These rings were determined to have good texture with an expansion of 1.67 as compared to an expansion of 1.54 for a 100% corn product control extruded through the same die.

D. Using the same die as in C, the level of amioca starch and gelatinized corn flour mixture was increased to 15% each. The product had an expansion of 1.62 as compared to 1.28 for a control made with 100% corn. The texture was determined to b=dense, less crisp, and took longer to chew before swallowing. The corn masa flavor was not as strong in this sample.

EXAMPLE 5

A. Lime-cooked corn was washed and drained as set forth above. A first portion was ground in a conventional stone grinder, adjusted so that approximately 5-10% of the corn particles exiting the grinder were retained on a U.S. #10 mesh screen, and about 25-30% were retained on a U.S. #20 mesh screen. The stone ground corn was immediately comminuted in an Urschel Comitrol mill fitted with a 10/30 head;

B. A second portion of the lime-cooked corn was comminuted in a Comitrol mill fitted with a 30/30 head, and then subjected to a second comminution through a Comitrol mill fitted with a 10/30 head;

C. A third portion of the lime-cooked corn was comminuted a first time using a 10/20 head, and then comminuted a second time using the same 10/20 head;

D. A fourth portion of the lime-cooked corn was comminuted a first time using a 10/30 head on a Comitrol mill, and then comminuted a second time on a Comitrol mill using a 10/30 head.

E. A fifth portion of the lime-cooked corn was subjected to a first comminution through a Comitrol mill using a 15/30 head, and then subjected to a second comminution using a 10/20 head. The 15/30 head used in this example had a different geometry than did the other heads used herein. The 15/30 head was designated a "K" head rather than the "B" heads otherwise used. The different head geometry will affect the manner in which the cooked corn is impelled against the knives, and will thereby affect the particle size produced;

F. A sixth portion of the lime-cooked corn was comminuted first and second times using a 30/30 head.

Each of the samples comminuted in Example 5 were tested to determine the particle size distribution after both the first and second comminution. A 100 gm sample comminuted corn was placed in a beaker of warm water and stirred gently to break up agglomerations. This mixture was poured onto tared screens and the mixture sprayed with warm water until all of the particles capable of passing through the screen had done so. The top screen was removed and the process repeated until only the U.S. #80 mesh screen remained. The screens were dried on the bottom and sides with a towel, drained 4-5 minutes and reweighed to determine the amount of product retained on each screen. In a number of instances, the measured amount of corn particles was greater than the amount initially utilized, because of water absorption. In such cases, the measured amounts were calculated to a 100% basis.

EXAMPLE 6

A large quantity of corn ring product was produced by the process of Example 1 for consumer testing. The comminuted corn samples were analyzed for particle size and moisture content. The particle size analysis was substantially similar to that reported in Example 1, and the relationship of the particle size to moisture is reported in FIG. 3.

Numerous of the products produced by the examples noted above were tested for expansion, hardness and texture.

The expansion during frying is believed to be a measure of significance in determining consumer appeal—a somewhat expanded product is desirable over a nonexpanded product, while a highly expanded product may be less desirable than a moderately expanded product. A plurality of product samples were randomly withdrawn from a product batch, and the thickness measured. The expansion for smooth rings and flat chip-type products was defined as the maximum thickness of the product divided by the width of the die opening. For fluted ring products, the expansion of only the base portion was determined, the base being the minimum thickness of the fluted product. It was visually determined that substantially all the expansion in a fluted product occurred in the base portion with very little expansion taking place in the undulating outer ribbed portion. The expansion was determined by subtracting the height of the die peak from the thickness measured in the product and dividing this measurement by the minimum die opening. Selected samples were subjected to hardness measurements by the Food Technology Corporation of Rockville, Maryland, using an FTC Model T-2100-CI Integrating Texture Test System. Finally, a texture profile was determined by blind sampling by trained testers using a 60-point scale, wherein higher numbers indicate more of the measured criteria.

As illustrated in Table I, the fluted ring made with the expansion-inducing starch of Example 1 had greater expansion and substantially lower hardness than the 100% corn fluted ring of Example 2. Additionally, the organoleptic analysis of texture indicates that the greater expansion results in perceptively lower hardness, less density and quicker "breakdown" (or disappearance within the mouth). The greater expansion of smooth rings and flat strips made with the 95% corn/5% starch formula of Example 3 is also apparent in Table I, consistent with the results of Examples 1 and 2. While the difference in the hardness measurement is not as dramatic, the texture analysis is consistent: products made from 95% corn and 5% of the expansion-inducing starch produce a product preferable to the 100% corn product.

Figure 2:
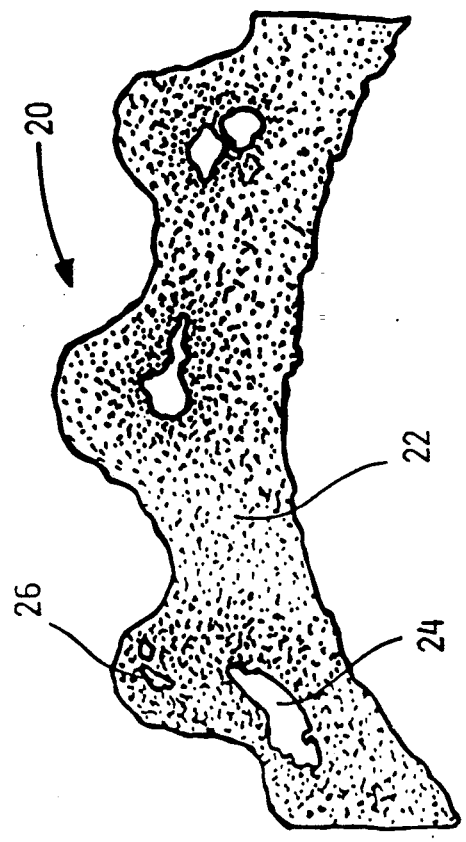
FIG. 2 is a graphic illustration of an expanded product.

The expansion of the products of Examples 1 and 2 are illustrated schematically in FIGS. 1 and 2. The product of Example 1 is illustrated in FIG. 1 wherein a portion of the fluted ring 10 is illustrated with a number of large separated areas 12 and a larger number of smaller voids 14. Most of the flutes 16 exhibit a dense, unexpanded area 18 at the apex of the ribbed or fluted portion. Conversely, the relatively unexpanded fluted rings 20 of Example 2 are illustrated in FIG. 2 having predominantly the dense unexpanded regions 22, with relatively few large voids 24 and even fewer small voids 26. The relatively light, airy texture of the products of Example 1 result in the superior texture profile illustrated in Table I. The expanded nature of the corn ring of FIG. 1 is representative of products produced with the expansion-inducing starch in Example 3.

Example 4 illustrates that there are a number of ingredients capable of serving the expansion-inducing role contemplated herein. However, the preferred starch is a pregelatinized starch at a level of about 5% on a dry solids basis; higher levels result in a loss of corn flavor.

The results of Example 5 are illustrated in Table II below. Applicants believe that the percentage of the final product ("Pass 2") passing through a U.S. #40 mesh screen (−40), and the percentage passing through a U.S. #80 mesh screen (−80) are of particular relevance to the production of products according to the present invention. "Fines" are those particles passing through the #80 mesh screen and are believed to play an important role in the expansion, hardness and texture profile of such products. A relatively high percentage of fines (anything over about 10%) produces a relatively dense, hard product when fried, which does not exhibit the expansion illustrated in FIG. 1 which is desired. As indicated in Table II, the product of Example 5A made according to the two-step process of the '091 patent produces a product having 62% of the corn particles passing through a #40 mesh screen and 40% passing through a #80 mesh screen. Examples 5B-F illustrate the effects of different screen sizes on the final particle size analysis. As noted above, the parameters of the screen are indicated with two numbers: viz., 10/30 indicates a bar having a width of 0.010 inches and an opening between adjacent bars of 0.030 inches. Therefore, a 10/30 screen would have a ratio of screen material:open area of 1:3.

As is apparent from Table II, the size of the screen material has little effect on the ultimate particle size analysis. However, the relative size of the open area is critically important in producing products having an appropriate particle size distribution. For example, Examples 5C and 5E, wherein the second pass is made through a screen having a 0.020-inch opening, the particles passing through the #40 mesh screen exceed 80% and those passing through the #80 mesh screen exceed 60%. By contrast, the products of Examples 5B, 5D and 5F, wherein the cooked corn is subjected only to an opening having a diameter of 0.030 inches, about 40% of the cut corn passes a #40 mesh screen and almost nothing passes a #80 mesh screen. As illustrated, the preferred process of Examples 5B, 5D and 5F produce a relatively narrow particle size distribution: most of the corn is retained on either a #40 or #60 mesh screen.

Examples 5B, 5D and 5F illustrate the process of the preferred embodiment, and illustrate ratios of screen material:open area of from 1:3 to 1:1. However, screens having such ratios of from 1:4 (a 10/40 head) to 2:1 (a 40/20 head) would be operative in the process of this invention. While the heads having ratios of from 1:4 to 2:1 would be operative in the process of the present invention, the preferred range appears to be a ratio of from 1:1 to 1:3.

Figure 3:
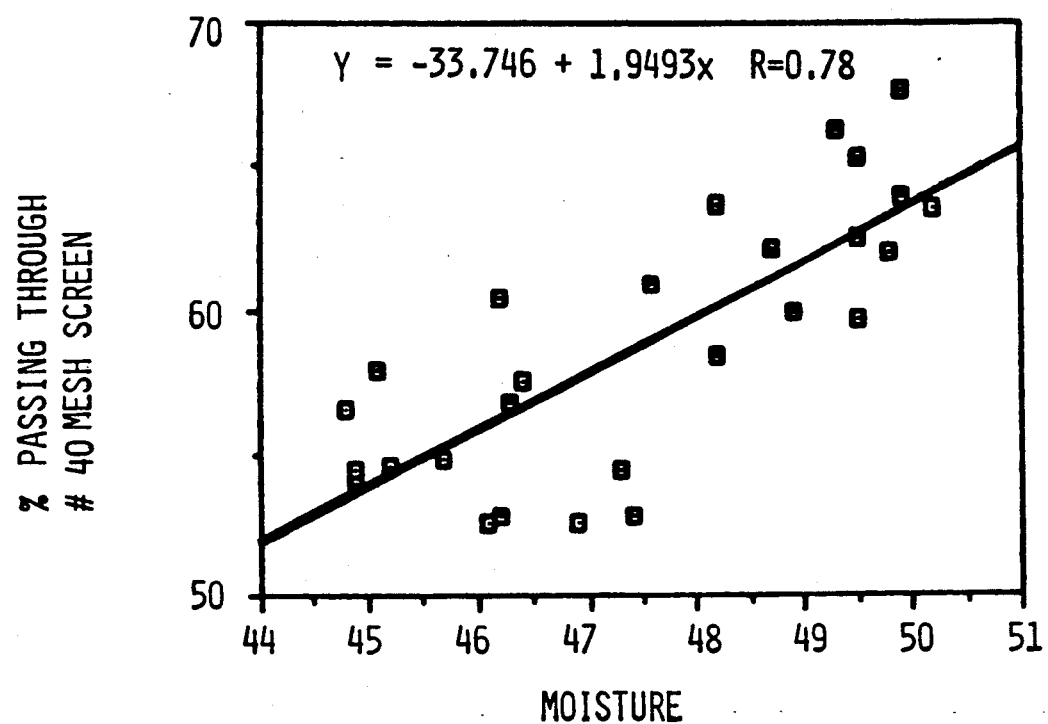
FIG. 3 is a graph illustrating the relationship of corn moisture and comminuted corn particle size distribution.

In order to determine whether or not variability within the various samples of comminuted corn can be explained by variability in the moisture of such corn, the moisture content of the comminuted corn as it exited the cutting mill a second time was measured. As illustrated in FIG. 3, as the moisture of the corn increases, the particle size distribution becomes finer—that is, more moist corn is more finely comminuted. Therefore, corn moisture when comminuted appear to play a significant role in the particle size distribution.

Applicants have determined that a consumer-preferred shape of the corn products of the present invention is a fluted ring. Applicants have extruded the corn dough of the present invention through numerous dies having various maximum and minimum die openings. The preferred die openings appear to range from a minimum of about 0.85 mm to a maximum of about 2.00 mm with approximately 18 rounded flutes about the circumference. However, Applicants have demonstrated minimum die openings in the range of about 0.5–1.2 mm, and maximum die openings in the range of about 1.45–2.25 mm.

TABLE I

| | FLUTED RING | | Example 3 SMOOTH RING | | Example 3 FLAT STRIP | |
| --- | --- | --- | --- | --- | --- | --- |
| | Example 1 | Example 2 | 100% Corn | 95% Corn | 100% Corn | 95% Corn |
| EXPANSION | 1.25 | 1.11 | 1.29 | 1.32 | 1.09 | 1.18 |
| HARDNESS FTC Force-distance (peak lbs. force) | 264 | 692 | 378 | 262 | 362 | 360 |
| TEXTURE | | | | | | |

TABLE I-continued

|  | FLUTED RING | | Example 3 SMOOTH RING | | Example 3 FLAT STRIP | |
| --- | --- | --- | --- | --- | --- | --- |
|  | Example 1 | Example 2 | 100% Corn | 95% Corn | 100% Corn | 95% Corn |
| Hardness | 35 | 44 | 35 | 30 | 36 | 32 |
| Denseness | 34 | 42 | 28 | 24 | 32 | 28 |
| Breakdown | 35 | 22 | 25 | 32 | 28 | 32 |

TABLE II

PARTICLE SIZE ANALYSIS

|  | Example 5A (stone grind + 10/30) | | Example 5B (30/30 + 10/30) | | Example 5C (10/20 + 10/20) | | Example 5D (10/30 + 10/30) | | Example 5E (15/30 + 10/20) | | Example 5F (30/30 + 30/30) | |
| --- | --- | --- | --- | --- | --- | --- | --- | --- | --- | --- | --- | --- |
|  | Pass 1 | Pass 2 | Pass 1 | Pass 2 | Pass 1 | Pass 2 | Pass 1 | Pass 2 | Pass 1 | Pass 2 | Pass 1 | Pass 2 |
| +10 mesh | 6.8 | 0 | 0 | 0 | 0 | 0 | 0 | 0 | 0 | 0 | 0 | 0 |
| +20 mesh | 32.6 | 5.9 | 22.4 | 7.1 | 4.9 | 0 | 36.5 | 6.8 | 5.8 | 0 | 28.3 | 6.4 |
| +40 mesh | 27.8 | 31.9 | 54.8 | 55.2 | 36.9 | 18.4 | 42.3 | 50.2 | 38.3 | 15.1 | 45.5 | 53.9 |
| −40 mesh | 32.8 | 62.2 | 22.8 | 37.7 | 58.2 | 81.6 | 21.2 | 43.0 | 55.9 | 84.9 | 26.2 | 39.7 |
| +60 mesh | 8.0 | 13.2 | 16.6 | 26.0 | 19.1 | 10.8 | 15.4 | 37.0 | 17.5 | 13.5 | 18.2 | 13.5 |
| +80 mesh | 5.7 | 8.3 | 6.2 | 9.0 | 10.2 | 6.3 | 5.8 | 6.0 | 18.7 | 8.0 | 8.0 | 6.5 |
| −80 mesh | 19.1 | 40.7 | 0 | 2.7 | 28.9 | 64.5 | 0 | 0 | 19.7 | 63.4 | 0 | 0 |

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:

1. A fried corn product having a controlled expanded texture comprising:
   a food piece having uniformly sized comminuted corn particles which uniformly sized comminuted corn particles are made from cooked and washed whole corn kernels that are comminuted to a preferred particle size distribution by successively impelling the corn against a blade and through a first screen sized to produce a first particle size distribution and then through a second screen sized to produce a second particle size distribution.

2. The fried corn product of claim 1 wherein: the food piece is formed as a fluted ring.

3. The fried corn product of claim 2 wherein the food piece includes an expansion-inducing starch-containing ingredient added to the comminuted corn kernels.

4. A fabricated corn product having a controlled expanded texture comprising:
   an individual food piece having uniformly sized comminuted corn particles which uniform sized comminuted corn particles are made by
   a. cooking whole corn kernels in an aqueous solution;
   b. washing the whole corn kernels;
   c. producing a comminuted corn having a preferred particle size distribution by cutting the corn a first time by impelling the corn against a blade and through a first screen sized to produce a first particle size distribution, and successively comminuting the comminuted corn a second time by cutting the comminuted corn by impelling the corn against a second blade and through a second screen to produce a second particle size distribution;
   d. forming a dough of the comminuted corn of step c;
   e. extruding the dough into individual dough pieces; and
   f. frying the individual dough pieces.

5. The fabricated corn product of claim 4 wherein the first and second screens have a ratio of open area:screen material of from about 1:2 to about 4:1.

6. The fabricated corn product of claim 5 wherein the first screen has a ratio of open area:screen material of 1:1.

7. The fabricated corn product of claim 5 wherein the second screen has a ratio of open area:screen material of 3:1.

8. The fabricated corn product of claim 4 wherein comminuting the corn the first time produces a particle size distribution such that about 40% of the comminuted corn passes through a #40 mesh screen.

9. The fabricated corn product of claim 4 wherein comminuting the corn the second time produces a particle size distribution such that about 40% of the comminuted corn passes through a #40 mesh screen and less than about 10% passes through a #80 mesh screen.

10. The fabricated corn product of claim 4 further including the step of extruding the dough through a fluted-ring die, wherein the ring die is provided with a smooth inner surface and a undulating outer surface to produce the individual food piece having a smooth inner surface and an undulating outer surface.

11. The fabricated corn product of claim 10 wherein the ring die has a minimum die opening of from about 0.5 mm to about 1.2 mm and a maximum die opening of from about 1.45 mm to about 2.25 mm.

12. The fabricated corn product of claim 4 wherein the food piece includes 2% to about 15% of an expansion-inducing starch-containing ingredient added to the comminuted corn.

13. A fabricated corn product having a controlled expanded texture comprising:
   an individual food piece having uniformly sized comminuted corn particles which uniform sized comminuted corn particles are made by
   a. cooking whole corn kernels in a lime and water solution, and thereafter washing the whole corn;
   b. comminuting the cooked whole kernel corn by cutting the corn in successive steps to produce particles in a preferred particle size distribution having a size sufficiently small to prevent extrusion die blockage by successively cutting the corn a first and second time;
   c. mixing the comminuted corn with from about 2% to about 15% of an expansion-including starch-containing ingredient to form a dough; and then d. extruding the dough into an individual food piece and thereafter frying the individual food piece.

14. The fabricated corn product of claim 13 wherein the step of successively cutting the corn a first and second time includes impelling the corn with a rotary impeller moving across a plurality of blades and a screen, said screen having a ratio of open area:screen material of from about 1:2 to about 4:1.

15. The fabricated corn product of claim 14 wherein the step of impelling the corn with a rotary impeller moving across a plurality of blades and a screen, said screen having a ratio of open area:screen material of from about 1:2 to about 4:1, includes the steps of impelling the corn a first time against a screen having an open area:screen material ratio of 1:1 and impelling the corn a second time against a screen having an open area:screen material ratio of 3:1.

16. The fabricated corn product of claim 14 further including the step of extruding the dough through a fluted-ring die, wherein the ring die is provided with a smooth inner surface and an undulating outer surface to provide the individual food piece with a smooth inner surface and an undulating outer surface.

17. The fabricated corn product of claim 16 wherein the ring die has a minimum die opening of from about 0.5 mm to about 1.2 mm and a maximum die opening of from about 1.45 mm to about 2.25 mm.

* * * * *